(12) United States Patent
Kasazaki

(10) Patent No.: US 12,134,978 B2
(45) Date of Patent: Nov. 5, 2024

(54) AFTERTREATMENT DEVICE AND ENGINE

(71) Applicant: YANMAR HOLDINGS CO., LTD., Osaka (JP)

(72) Inventor: Shinsuke Kasazaki, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 3 days.

(21) Appl. No.: 18/351,627

(22) Filed: Jul. 13, 2023

(65) Prior Publication Data

US 2024/0068386 A1 Feb. 29, 2024

(30) Foreign Application Priority Data

Aug. 25, 2022 (JP) ................. 2022-134346

(51) Int. Cl.
  *F01N 3/02* (2006.01)
  *F01N 3/035* (2006.01)
  *F01N 3/20* (2006.01)

(52) U.S. Cl.
  CPC .......... *F01N 3/035* (2013.01); *F01N 3/2066* (2013.01); *F01N 2250/02* (2013.01); *F01N 2610/02* (2013.01); *F01N 2610/08* (2013.01); *F01N 2610/1453* (2013.01)

(58) Field of Classification Search
  CPC ........ F01N 3/035; F01N 3/2066; F01N 3/021; F01N 3/0814; F01N 3/2882; F01N 3/2892; F01N 3/0222; F01N 3/0821; F01N 13/009; F01N 2250/02; F01N 2610/02; F01N 2610/08; F01N 2610/1453; F01N 2610/14; F01N 2570/14; Y02T 10/12; Y02T 10/40
  See application file for complete search history.

(56) References Cited

U.S. PATENT DOCUMENTS

| | | | | |
|---|---|---|---|---|
| 10,626,767 | B2* | 4/2020 | Tomita | B01D 53/9431 |
| 10,883,411 | B2* | 1/2021 | van den Heuvel | F01N 3/035 |
| 2015/0020484 | A1* | 1/2015 | Kimura | F01N 3/2066 55/459.1 |
| 2016/0305296 | A1* | 10/2016 | Tobe | F01N 3/021 |
| 2017/0204766 | A1* | 7/2017 | Matsui | F01N 13/008 |

FOREIGN PATENT DOCUMENTS

JP 2016075213 A 5/2016

* cited by examiner

*Primary Examiner* — Dapinder Singh
(74) *Attorney, Agent, or Firm* — Future IP LLC; Tomoko Nakajima

(57) ABSTRACT

Provided are an aftertreatment device capable of purifying exhaust gas with a compact configuration and an engine including the aftertreatment device. An aftertreatment device includes: a DPF case; an SCR case; an exhaust connection pipe that connects the DPF case and the SCR case; a mixer arranged at an upstream end of the exhaust connection pipe in a flow direction of exhaust gas; and a urea water injection portion that injects urea water into the mixer.

11 Claims, 13 Drawing Sheets

AFTERTREATMENT DEVICE AND ENGINE

TECHNICAL FIELD

The present invention relates to an aftertreatment device that purifies exhaust gas and an engine including the aftertreatment device.

BACKGROUND ART

For example, Patent Document 1 discloses a technique for reducing nitrogen oxides in exhaust gas in a diesel engine. In Patent Document 1, a urea water injection portion, a urea mixture pipe, and an SCR catalyst for reducing a urea selective catalyst are provided in the middle of an exhaust pipe through which exhaust gas passes. Urea water is injected from the urea water injection portion into the exhaust gas passing through the urea mixture pipe. Then, the urea water is mixed with the exhaust gas while being evaporated by heat of the exhaust gas in the urea mixture pipe. The exhaust gas mixed with the urea water passes through the SCR catalyst, and thus nitrogen oxides in the exhaust gas are reduced.

PRIOR ART DOCUMENT

Patent Document

Patent Document 1: JP-A-2016-075213

SUMMARY OF INVENTION

Technical Problem

Patent Document 1 does not consider a configuration that promotes mixing of exhaust gas and urea water in the urea mixture pipe. Therefore, a long pipe length is needed to evaporate the urea water by the heat of the exhaust gas in the urea mixture pipe. When the urea mixture pipe is long, the urea water injection portion greatly protrudes from an outer shape of an engine main body, which may impair mountability on a vehicle.

The present invention has been made to solve the above problems, and an object thereof is to provide an aftertreatment device capable of purifying exhaust gas with a compact configuration and an engine including the aftertreatment device.

Solution to Problem

An aftertreatment device according to one aspect of the present invention includes: a DPF case; an SCR case; an exhaust connection pipe that connects the DPF case and the SCR case; a mixer arranged at an upstream end of the exhaust connection pipe in a flow direction of exhaust gas; and a urea water injection portion that injects urea water into the mixer.

An engine according to another aspect of the present invention includes: the above aftertreatment device; and an engine main body positioned below the aftertreatment device.

Advantageous Effects of Invention

Exhaust gas can be purified with a compact configuration.

DESCRIPTION OF EMBODIMENTS

Embodiments of the present invention will be described below with reference to the drawings. In the present embodiment, a tractor will be described as an example of a work vehicle. However, the work vehicle may be a manned work vehicle or unmanned work vehicle other than the tractor. Examples of the manned work vehicle include various harvesters, mowers, rice transplanters, combine harvesters, civil engineering and construction work machines (e.g. wheel loader), and snowplows. Examples of the unmanned work vehicle include unmanned mowers.

In the present specification, a direction in which the tractor serving as the work vehicle travels during work is defined as "front", and a direction opposite thereto is defined as "rear", unless otherwise specified. A right side and a left side in a traveling direction of the tractor are defined as right and left, respectively. A direction perpendicular to a back and forth direction and a left and right direction of the tractor is defined as a vertical direction. At this time, a downstream side in the direction of gravity is defined as a lower side, and the opposite side (upstream side) is defined as an upper side.

[1. Configuration of Work Vehicle]

Figure 1:
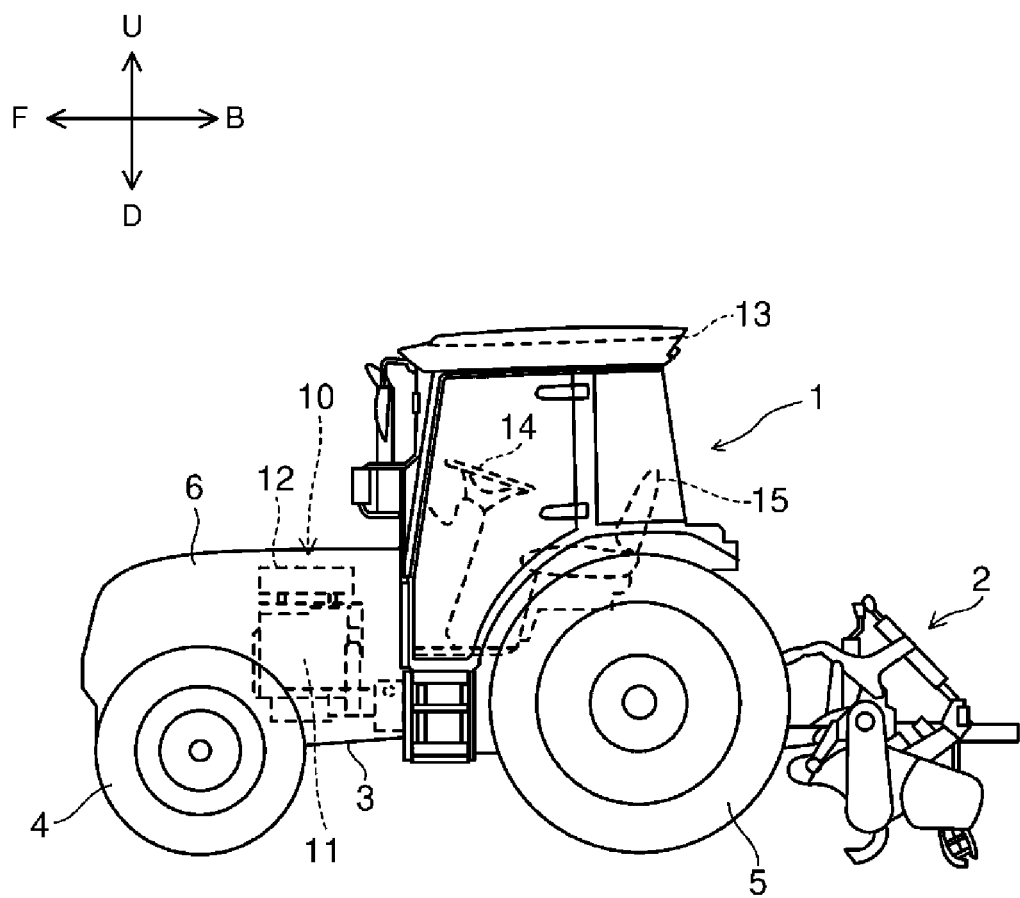
FIG. 1 is an explanatory view illustrating a schematic configuration of a tractor according to an embodiment of the present invention.

FIG. 1 is an explanatory view illustrating a schematic configuration of a tractor 1 according to the present embodiment. The tractor 1 includes a vehicle body 3 to which a work machine 2 is attachable on the rear side. A pair of left and right front wheels 4 is attached to a front portion of the vehicle body 3. A pair of left and right rear wheels 5 is attached to a rear portion of the vehicle body 3. A bonnet 6 is arranged in the front portion of the vehicle body 3. The bonnet 6 houses an engine 10 (diesel engine) serving as a driving source.

The engine 10 includes an engine main body 11 and an aftertreatment device (ATD) 12. The engine main body 11 is positioned below the aftertreatment device 12. The aftertreatment device 12 purifies exhaust gas discharged from the engine main body 11 and is also referred to as an exhaust gas aftertreatment device.

A cabin 13 for a user to board is provided behind the bonnet 6. A steering wheel 14 for the user to steer, a driver seat 15 for the user, and the like are provided in the cabin 13. Further, a display unit (not illustrated) for the user seated in the driver seat 15 to visually recognize information regarding the tractor 1 is provided in the cabin 13.

[2. Details of Engine]

Figure 2:
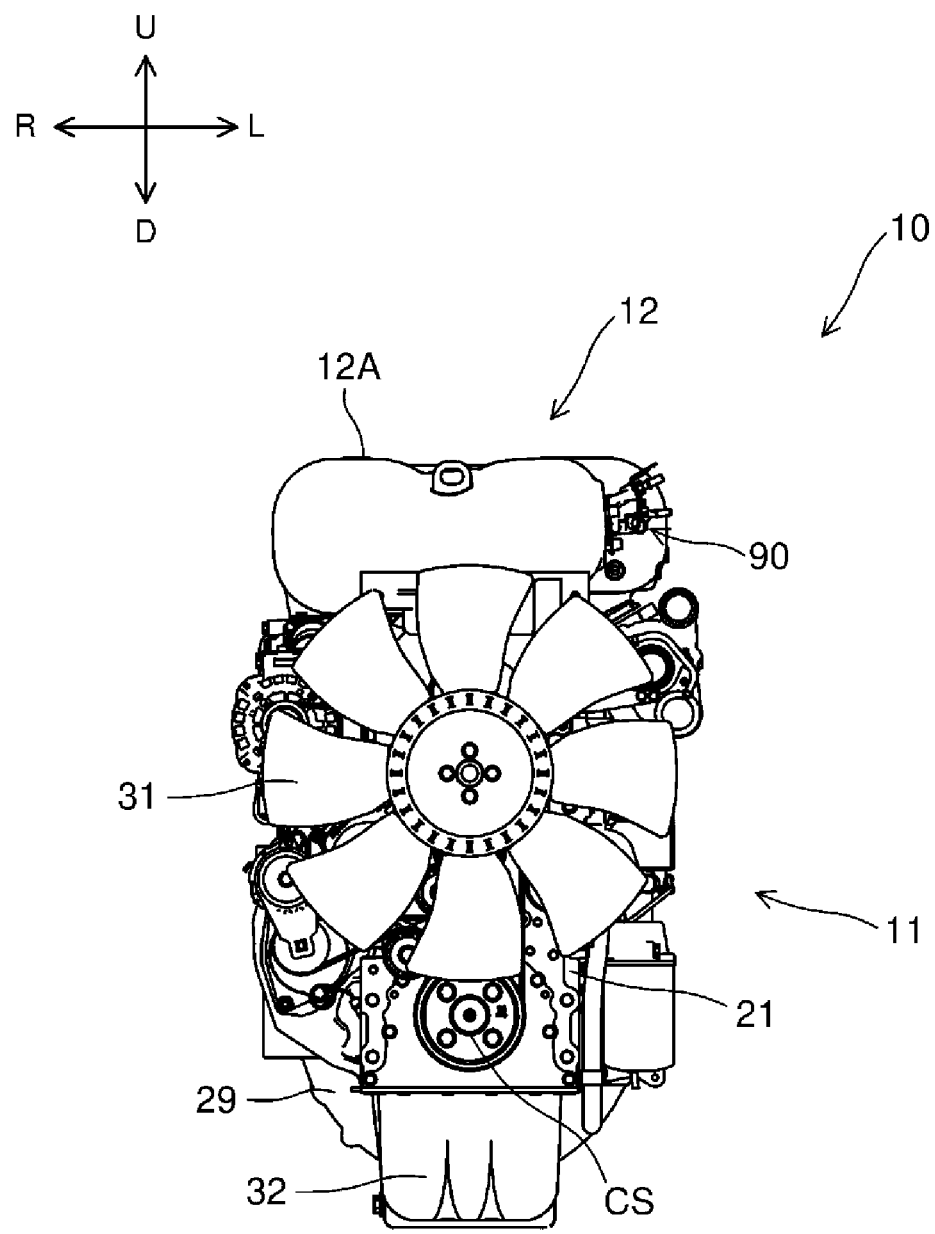
FIG. 2 is a front view of an engine included in the tractor.
Figure 3:
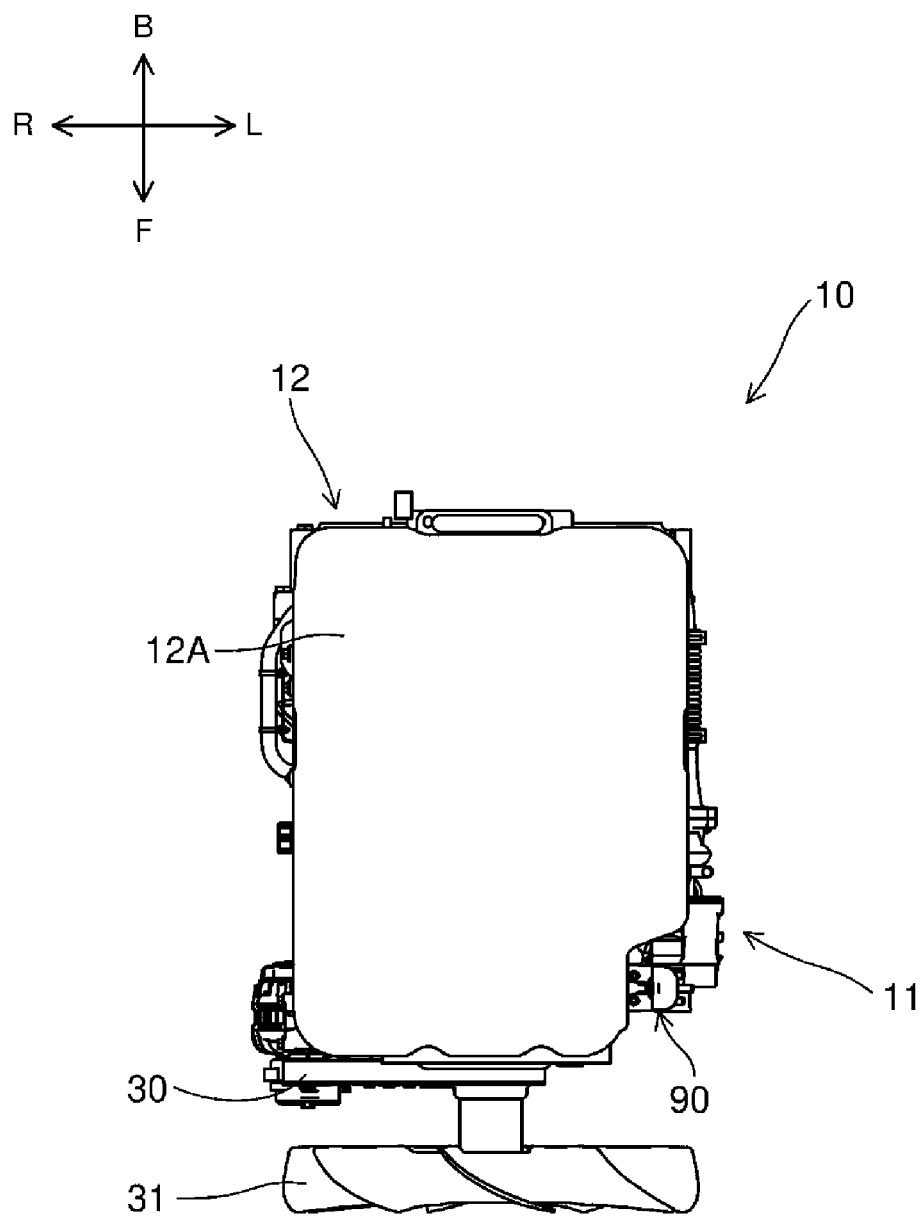
FIG. 3 is a plan view of the engine.
Figure 4:
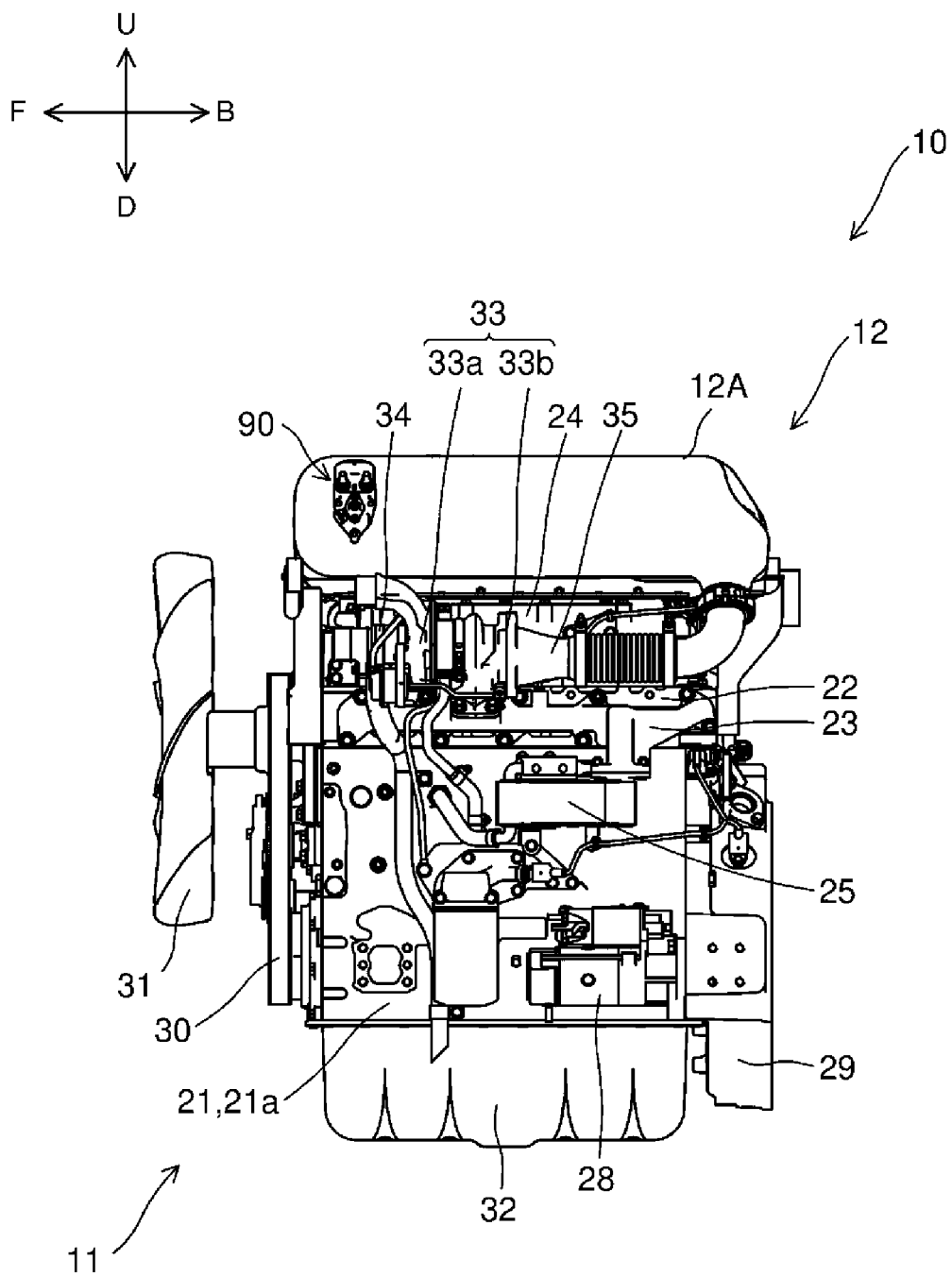
FIG. 4 is a left side view of the engine.
Figure 5:
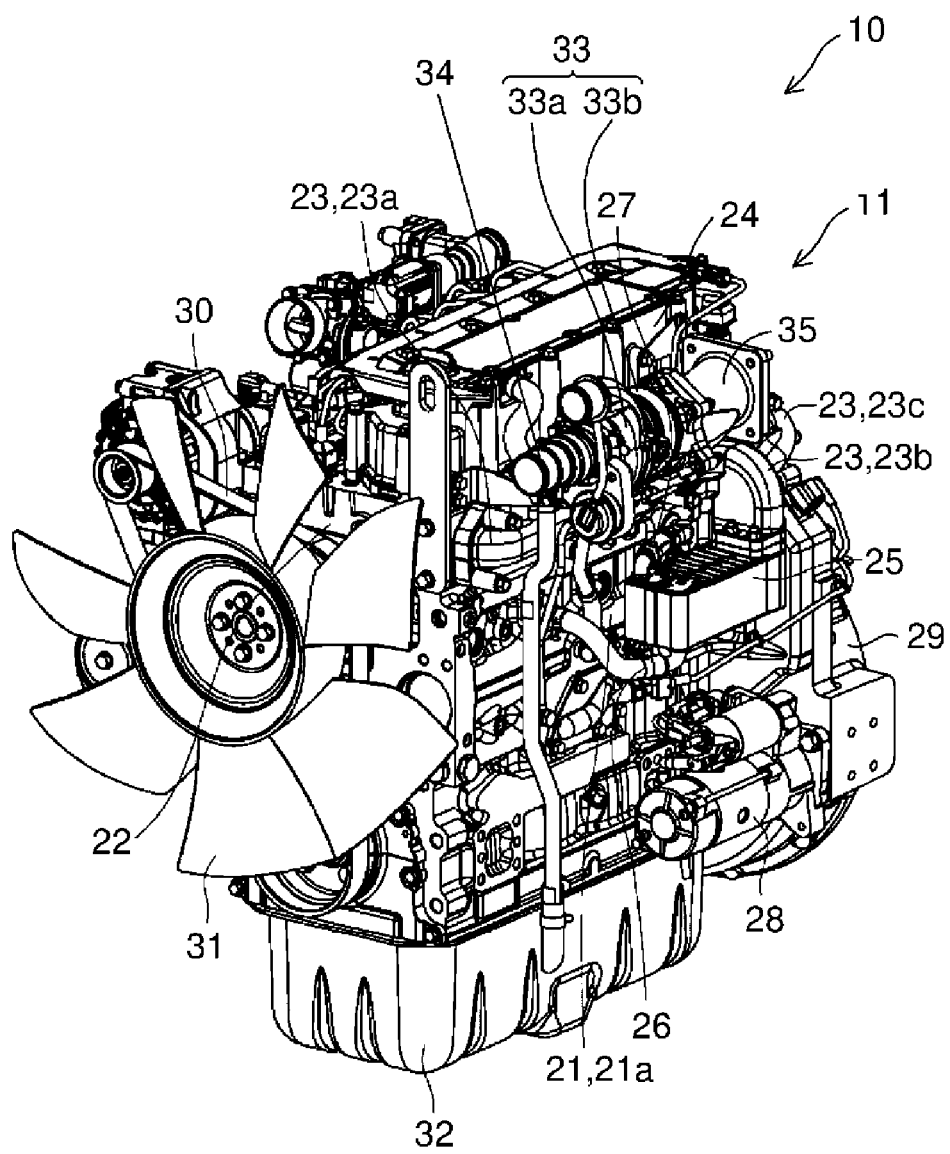
FIG. 5 is a perspective view of an engine main body of the engine.

FIG. 2 is a front view of the engine 10. FIG. 3 is a plan view of the engine 10. FIG. 4 is a left side view of the engine 10. FIG. 5 is a perspective view of the engine main body 11.

(2-1. Engine Main Body)

As illustrated in FIGS. 2 to 5, the engine main body 11 includes a cylinder block 21, a cylinder head 22, an exhaust manifold 23, a cylinder head cover 24, an exhaust gas recirculation (EGR) cooler 25, a first cooling water pipe 26, and a second cooling water pipe 27.

The cylinder block 21 includes therein a plurality of cylinders and a plurality of pistons. Fuel is combusted by piston movement of the plurality of pistons in the plurality of cylinders. As a result, power is generated in the cylinder block 21.

The cylinder block 21 rotatably supports a crankshaft CS (see FIG. 2). The crankshaft CS extends through the cylinder block 21 in the back and forth direction and is rotated by the power generated in the cylinder block 21.

Exhaust gas generated by fuel combustion in the cylinder block 21 flows into the exhaust manifold 23 through the cylinder head 22 (see FIGS. 4 and 5) provided on the upper side of the cylinder block 21. The exhaust manifold 23 collects and circulates the exhaust gas discharged from the cylinder head 22. The exhaust manifold 23 is arranged on the left side (exhaust side) of the cylinder head 22. As illustrated in FIG. 5, the exhaust manifold 23 includes a main body 23a, a flange portion 23b, and a pipe portion 23c in this order from the front to the rear.

The cylinder head cover 24 is provided on the upper side of the cylinder head 22. The cylinder head cover 24 houses a valvetrain for operating an intake valve and an exhaust valve (both not illustrated) of each cylinder.

The EGR cooler 25 is arranged below the exhaust manifold 23. Therefore, the EGR cooler 25 is arranged on the left side (exhaust side) of the engine main body 11. More specifically, the EGR cooler 25 is arranged on a left side surface 21a of the cylinder block 21.

The EGR cooler 25 cools EGR gas that is a part of the exhaust gas exhausted from the exhaust manifold 23. Specifically, the EGR cooler 25 is connected to the first cooling water pipe 26 and the second cooling water pipe 27. The EGR cooler 25 includes therein a gas flow path through which the EGR gas flows and a cooling water flow path through which cooling water flows. The first cooling water pipe 26 communicates with an inlet (cooling water inlet) of the cooling water flow path of the EGR cooler 25. The second cooling water pipe 27 communicates with an outlet (cooling water outlet) of the cooling water flow path of the EGR cooler 25. When flowing through the gas flow path of the EGR cooler 25, the EGR gas is cooled by the cooling water flowing through the cooling water flow path of the EGR cooler 25.

The EGR cooler 25 is attached to the flange portion 23b of the exhaust manifold 23. The flange portion 23b of the exhaust manifold 23 is connected to an upper surface of the EGR cooler 25.

The EGR gas flows into the EGR cooler 25 through the flange portion 23b of the exhaust manifold 23 and is cooled by the EGR cooler 25. The cooled EGR gas is returned from the EGR cooler 25 to the intake side of the engine main body 11 through the flange portion 23b and the pipe portion 23c of the exhaust manifold 23.

The engine main body 11 further includes a starter 28, a flywheel housing 29, a belt member 30, a cooling fan 31, and an oil pan 32.

The starter 28 is attached to the flywheel housing 29 on the left side (exhaust side) of the cylinder block 21. The starter 28 transmits a rotational force to a flywheel (not illustrated) housed in the flywheel housing 29 when the engine starts.

The flywheel housing 29 is arranged behind the cylinder block 21. The flywheel is connected to a rear end of the crankshaft CS supported by the cylinder block 21. The flywheel integrally rotates with the crankshaft CS and applies an inertial force to the crankshaft CS.

The belt member 30 is rotated by power transmitted from the crankshaft CS. The cooling fan 31 is positioned on the front side of the engine main body 11 and is rotated by power transmitted from the belt member 30. The cooling fan 31 cools the cooling water.

The oil pan 32 is arranged below the cylinder block 21. The oil pan 32 stores lubricating oil. The lubricating oil in the oil pan 32 is supplied to each lubrication portion of the engine main body 11. The lubricating oil supplied to each lubrication portion is then returned to the oil pan 32.

The engine main body 11 further includes an intake manifold (not illustrated). The intake manifold is arranged on a side surface on the right side (intake side) of the cylinder head 22. The intake manifold collects the cooled EGR gas flowing in from the EGR cooler 25 through the pipe portion 23c, an EGR gas pipe (not illustrated), and an EGR valve (not illustrated) and fresh air to generate mixed gas and causes the mixed gas to flow through the cylinder head 22. The cylinder head 22 causes the mixed gas flowing in from the intake manifold to flow to the cylinder block 21. The mixed gas is supplied to each cylinder in the cylinder block 21.

The engine main body 11 further includes a turbocharger 33, an intake pipe 34, a turbocharging pipe (not illustrated), and a connection pipe 35. The turbocharger 33 increases a pressure of air supplied to the inside of the cylinder block 21. The turbocharger 33 is arranged on the left side of the cylinder head cover 24. The turbocharger 33 includes a compressor case 33a and a turbine case 33b. The compressor case 33a includes therein a blower wheel (not illustrated). The turbine case 33b includes therein a turbine wheel (not illustrated).

The intake pipe 34 is connected to an intake inlet of the compressor case 33a. The turbocharging pipe is connected to an intake outlet of the compressor case 33a.

The exhaust manifold 23 is connected to an exhaust inlet of the turbine case 33b. The connection pipe 35 is connected to an exhaust outlet of the turbine case 33b. The connection pipe 35 is connected to a DPF case 40 (see FIG. 6) described later of the aftertreatment device 12.

The exhaust gas supplied from each cylinder of the engine main body 11 to the turbocharger 33 through the exhaust manifold 23 is discharged to the outside through the turbine case 33b of the turbocharger 33, the connection pipe 35, the aftertreatment device 12, a muffler, and the like.

(2-2. Aftertreatment Device)

Figure 6:
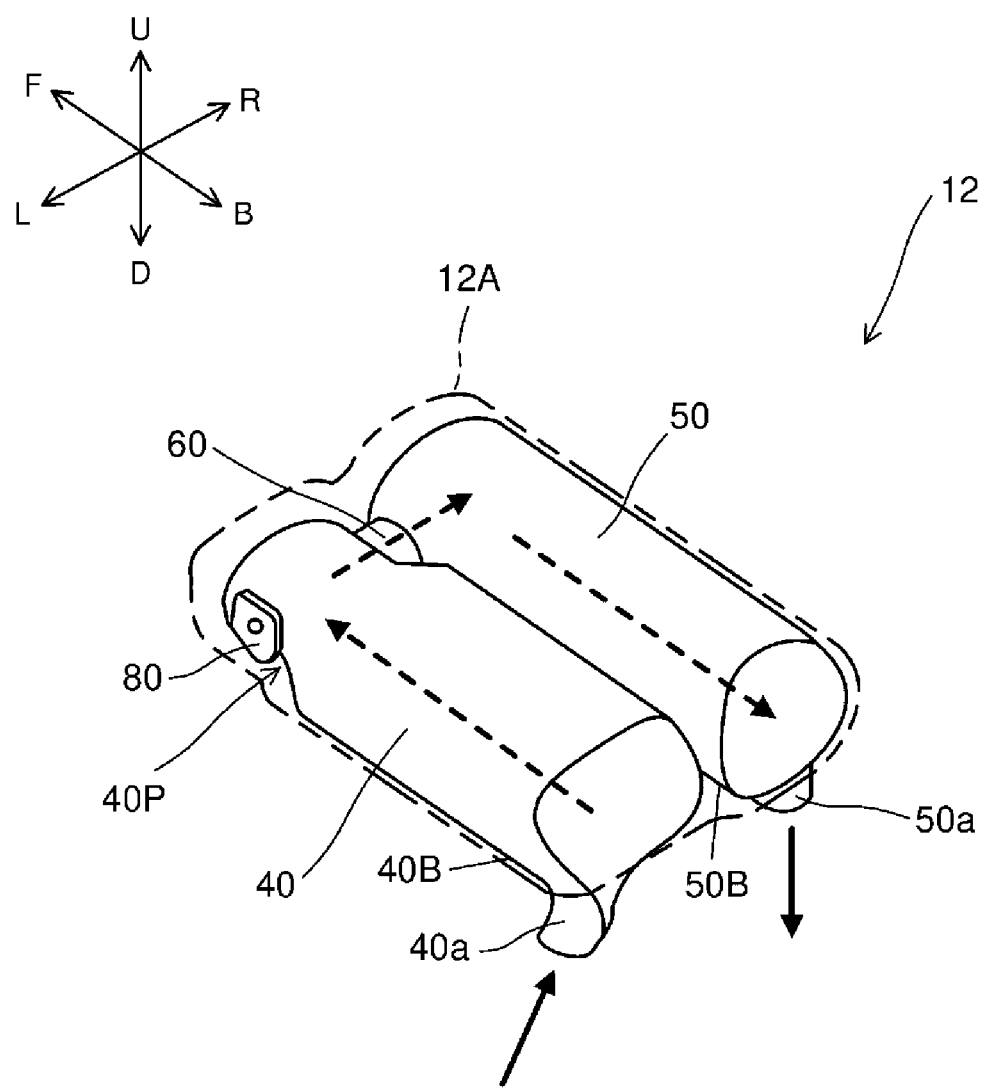
FIG. 6 is a perspective view illustrating an external appearance of an aftertreatment device included in the engine.
Figure 7:
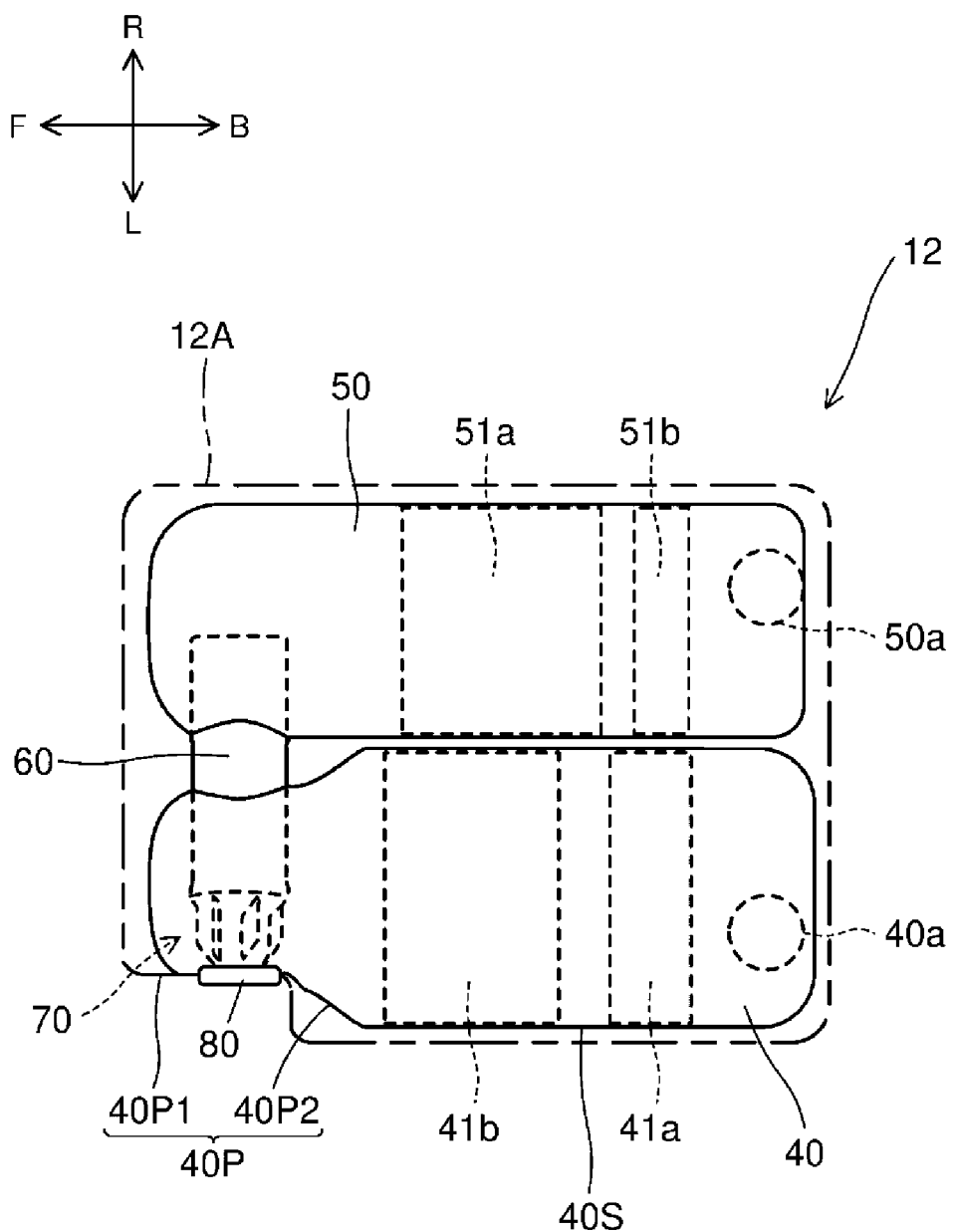
FIG. 7 is a plan view of the aftertreatment device.

FIG. 6 is a perspective view illustrating an external appearance of the aftertreatment device 12. FIG. 7 is a plan view of the aftertreatment device 12. The aftertreatment device 12 includes the DPF case 40, an SCR case 50, an exhaust connection pipe 60, and a shell 12A. The shell 12A is an outer shell that covers the DPF case 40, the SCR case 50, and the exhaust connection pipe 60 via a heat insulating material (not illustrated). In FIGS. 6 and 7, the shell 12A is indicated by an imaginary line (two-dot chain line) for the purpose of clearly illustrating an internal configuration of the aftertreatment device 12. In FIG. 6, a flow direction of the exhaust gas in the aftertreatment device 12 is indicated by arrows.

The DPF case 40 is a hollow case formed in an elongated shape in the back and forth direction. Hereinafter, the back and forth direction of the DPF case 40 is also referred to as a longitudinal direction. The left and right direction intersecting the back and forth direction (longitudinal direction) of the DPF case 40 is also referred to as a lateral direction. The longitudinal direction is along a direction in which the crankshaft CS (see FIG. 2) of the engine main body 11 extends. An exhaust inlet pipe 40a is positioned on the rear end side of a bottom surface portion 40B of the DPF case 40. The exhaust inlet pipe 40a is connected to the connection pipe 35 (see FIG. 5) of the engine main body 11.

As illustrated in FIG. 7, the DPF case 40 includes an oxidation catalyst 41a and a soot filter 41b. The oxidation catalyst 41a and the soot filter 41b are arranged in the DPF case 40 in this order from the upstream side in the flow direction of the exhaust gas.

The oxidation catalyst 41a promotes oxidation of carbon monoxide, nitrogen monoxide, and the like contained in the exhaust gas. The soot filter 41b collects particulate matters (PMs) such as soot contained in the exhaust gas. The PMs collected by and deposited on the soot filter 41b are burned and removed by performing DPF regeneration control at an appropriate timing.

The SCR case 50 is a hollow case formed in an elongated shape in the back and forth direction. The SCR case 50 is arranged side by side with the DPF case 40 on the right side of the DPF case 40. That is, the SCR case 50 is positioned side by side with the DPF case 40 in the lateral direction intersecting the longitudinal direction of the DPF case 40. The length of the SCR case 50 in the back and forth direction is substantially equal to the length of the DPF case 40 in the back and forth direction. An exhaust outlet pipe 50a is positioned on the rear end side of a bottom surface portion 50B (see FIG. 6) of the SCR case 50. The exhaust gas discharged from the exhaust outlet pipe 50a is guided to the muffler or the like and is discharged to the outside.

The SCR case 50 includes a selective reduction catalyst (SCR) 51a and an ammonia slip suppression catalyst (ASC) 51b. The selective reduction catalyst 51a and the ammonia slip suppression catalyst 51b are arranged in the SCR case 50 in this order from the upstream side in the flow direction of the exhaust gas.

The selective reduction catalyst 51a selectively reduces NOx contained in the exhaust gas in an atmosphere in which ammonia ($NH_3$) taken into the exhaust gas from the urea water injected by a urea water injection portion 90 (see FIG. 10) described later is present.

The ammonia slip suppression catalyst 51b includes an oxidation catalyst such as platinum and oxidizes ammonia accidentally passing through the selective reduction catalyst 51a. Oxidizing ammonia to change the oxidized ammonia to nitrogen, nitrogen monoxide, water, or the like avoids release of ammonia to the outside.

Figure 8:
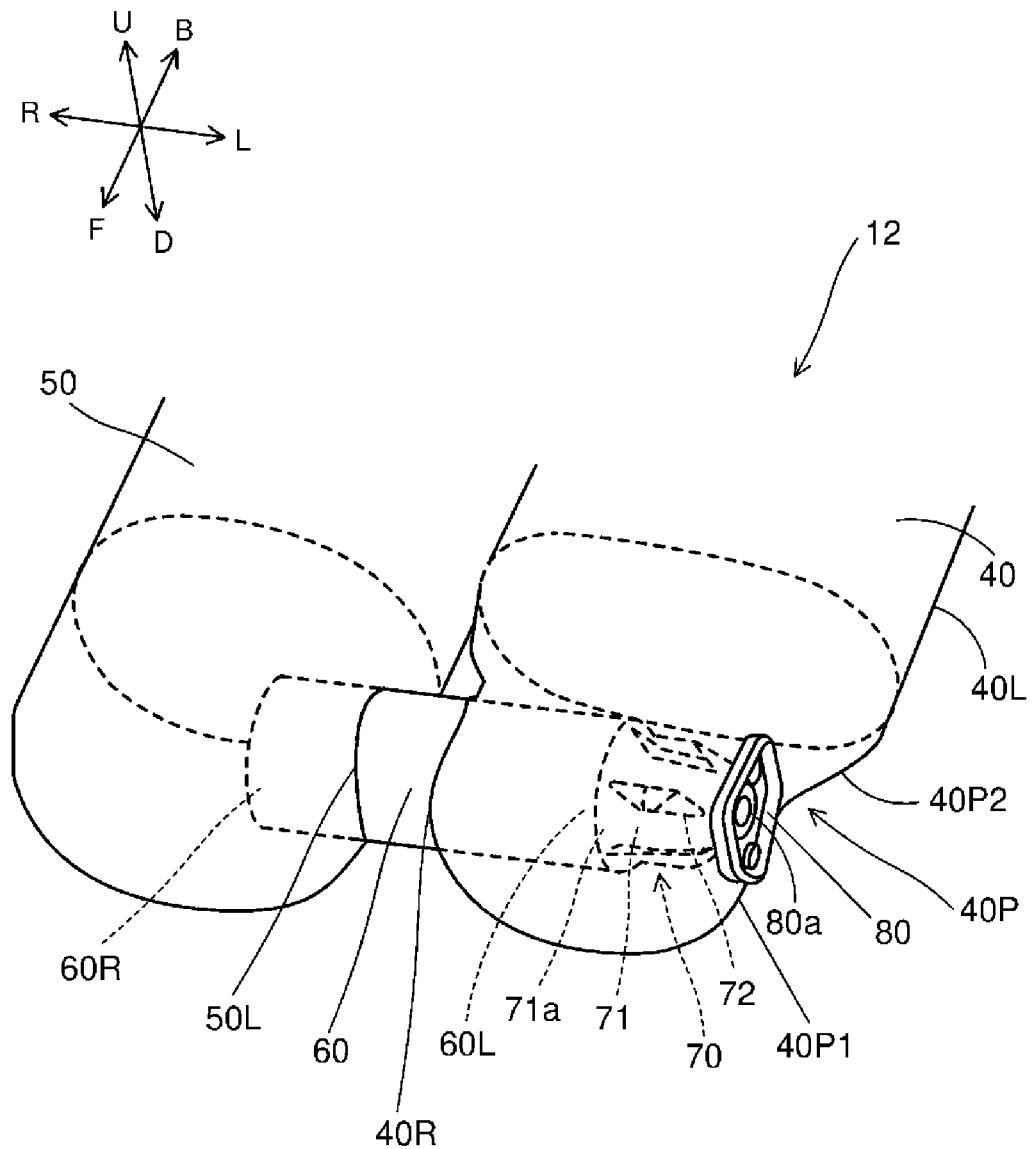
FIG. 8 is an enlarged perspective view illustrating a portion near an exhaust connection pipe of the aftertreatment device.

FIG. 8 is an enlarged perspective view illustrating a portion near the exhaust connection pipe 60 of the aftertreatment device 12. The exhaust connection pipe 60 is a hollow pipe that connects the DPF case 40 and the SCR case 50. The exhaust connection pipe 60 extends in the left and right direction. That is, the exhaust connection pipe 60 extends in the lateral direction of the DPF case 40 and the SCR case 50.

The exhaust connection pipe 60 penetrates a left side surface portion 50L of the SCR case 50 in the right direction. Therefore, a right end 60R of the exhaust connection pipe 60 is positioned inside the SCR case 50. The exhaust connection pipe 60 is connected to the left side surface portion 50L of the SCR case 50 by welding or the like.

The exhaust connection pipe 60 penetrates a right side surface portion 40R of the DPF case 40 in the left direction. Therefore, a left end 60L of the exhaust connection pipe 60 is positioned inside the DPF case 40. That is, a part of the exhaust connection pipe 60 is positioned inside the DPF case 40. The exhaust connection pipe 60 is connected to the right side surface portion 40R of the DPF case 40 by welding or the like.

The aftertreatment device 12 further includes a mixer 70. The mixer 70 is positioned on the upstream side of the exhaust connection pipe 60 in the flow direction of the exhaust gas flowing through the exhaust connection pipe 60 (the left side in the left and right direction in FIGS. 7 and 8) and is connected to the left end 60L of the exhaust connection pipe 60. That is, the mixer 70 is arranged at an upstream end (left end 60L) of the exhaust connection pipe 60 in the flow direction of the exhaust gas. In the present embodiment, the left end 60L of the exhaust connection pipe 60 is positioned inside the DPF case 40 as described above, and thus the mixer 70 connected to the left end 60L of the exhaust connection pipe 60 is also positioned inside the DPF case 40.

Figure 9:
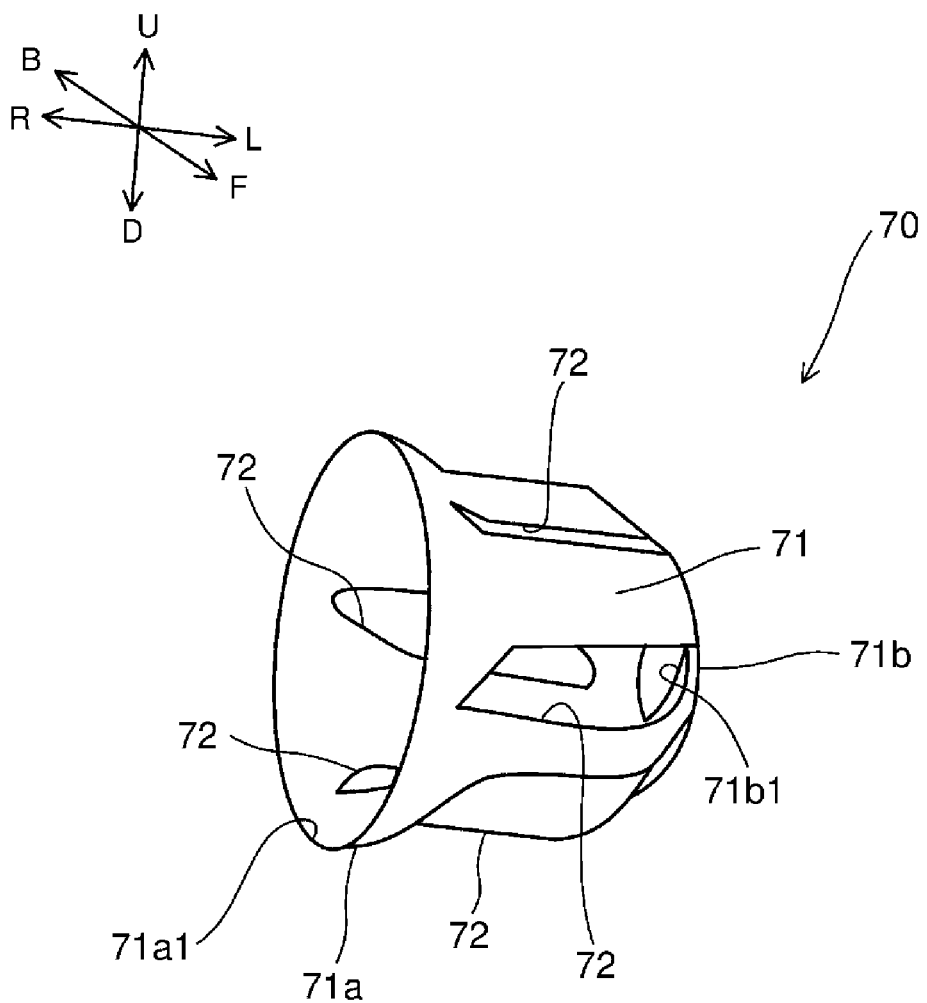
FIG. 9 is a perspective view of a mixer included in the aftertreatment device.

FIG. 9 is a perspective view of the mixer 70 alone. The mixer 70 includes a cylindrical body 71. The cylindrical body 71 has a cylindrical shape having openings at both ends in one direction (e.g. the left and right direction).

More specifically, the cylindrical body 71 has one end 71a and the other end 71b. The one end 71a is one end (e.g. right end) of the cylindrical body 71 in the one direction. The other end 71b is the other end (e.g. left end) of the cylindrical body 71 in the one direction. The one end 71a of the cylindrical body 71 has a first opening 71a1 having substantially the same opening diameter as the exhaust connection pipe 60. The one end 71a is connected to the left end 60L of the exhaust connection pipe 60 by welding or the like.

The other end 71b of the cylindrical body 71 has a second opening 71b1 having an opening diameter smaller than that of the one end 71a. The other end 71b is connected to a bottom 40P1 of a recess 40P (see FIGS. 7 and 8) of the DPF case 40 by welding or the like from the inside of the DPF case 40.

As illustrated in FIG. 9, a plurality of slits 72 is formed on a side surface of the cylindrical body 71. The plurality of slits 72 is positioned at predetermined intervals in a circumferential direction of the cylindrical body 71. The circumferential direction of the cylindrical body 71 is a direction around a central axis when the one direction of the cylindrical body 71 is set as the central axis. At least one slit 72 may be formed in the circumferential direction of the cylindrical body 71.

Here, the recess 40P will be supplementarily described. As illustrated in FIGS. 7 and 8, the DPF case 40 has the recess 40P. The recess 40P is recessed in the lateral direction from the side surface portion along the longitudinal direction of the DPF case 40. In the present embodiment, the side surface portion of the DPF case 40 is a left side surface portion 40L positioned on the left side of the DPF case 40 (the side farthest from the SCR case 50). The recess 40P is positioned in front of the left side surface portion 40L and is recessed in the right direction from the left side surface portion 40L. In the present embodiment, a recess recessed in the left direction is formed in front of the right side surface portion 40R of the DPF case 40, but the recess may not be provided.

The recess 40P has the bottom 40P1 and a connection portion 40P2. The bottom 40P1 is positioned away from the left side surface portion 40L in the lateral direction (here, the right direction). The connection portion 40P2 connects the bottom 40P1 and the left side surface portion 40L.

An attaching portion 80 is attached to the bottom 40P1 of the DPF case 40 from the outside of the DPF case 40. That is, the attaching portion 80 is positioned at the bottom 40P1 of the recess 40P. Therefore, the attaching portion 80 is positioned away in the lateral direction from the side surface portion (left side surface portion 40L) along the longitudinal direction of the DPF case 40.

The attaching portion 80 has a hole 80a. The hole 80a communicates with the second opening 71b1 of the other end 71b (see FIG. 9) of the mixer 70. The following urea water injection portion 90 is attached to the attaching portion 80. That is, the DPF case 40 includes the attaching portion 80 to which the urea water injection portion 90 is attached. The periphery of the attaching portion 80 in the shell 12A is opened in advance. Therefore, the urea water injection portion 90 can be attached to the attaching portion 80, without being hindered by the shell 12A.

Figure 10:
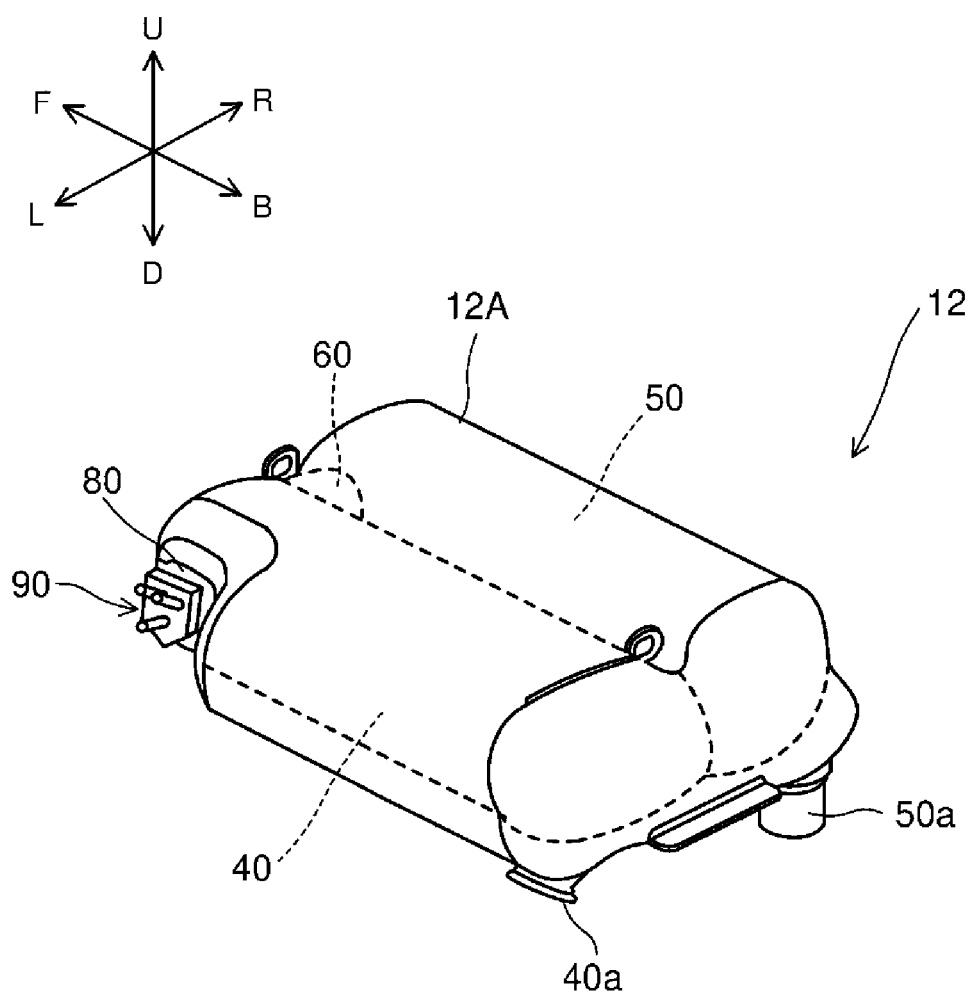
FIG. 10 is a perspective view of the aftertreatment device to which a urea water injection portion is attached.

FIG. 10 is a perspective view of the aftertreatment device 12 in which the urea water injection portion 90 is attached to the attaching portion 80. As illustrated in FIG. 10, the aftertreatment device 12 further includes the urea water injection portion 90. The urea water injection portion 90 injects urea water to the mixer 70 (see FIGS. 7 and 8). As described above, the attaching portion 80 has the hole 80a (see FIG. 8) communicating with the mixer 70. Thus, by attaching the urea water injection portion 90 to the attaching portion 80, the urea water can be injected to the mixer 70 through the hole 80a of the attaching portion 80.

The urea water injection portion 90 includes, for example, a urea water injection nozzle. The urea water injection portion 90 is a dosing module (DM) that injects urea water supplied from a urea water supply device 92 (see FIG. 12) and adds the urea water to the exhaust gas.

Figure 11:
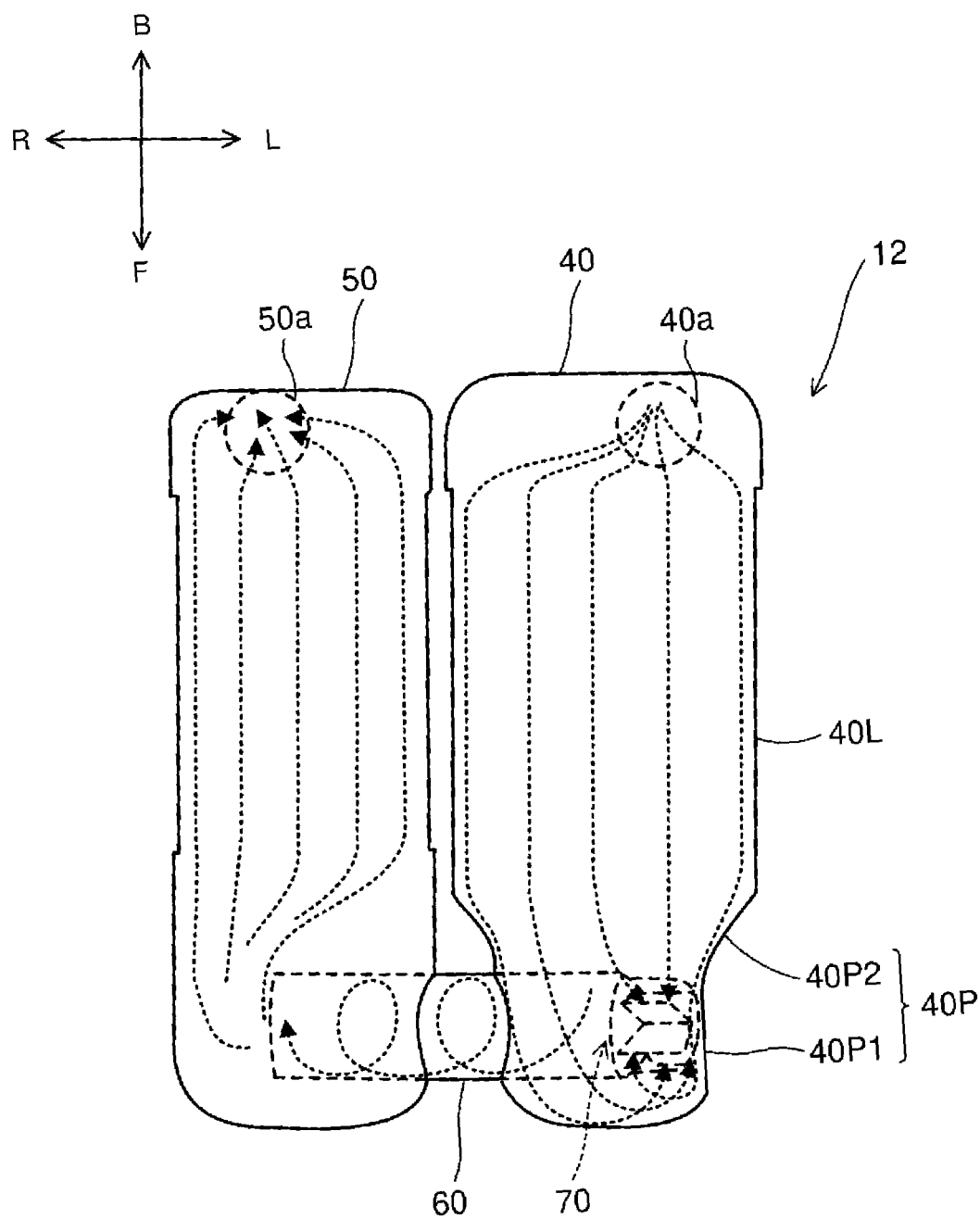
FIG. 11 is an explanatory view schematically illustrating a flow of exhaust gas in the aftertreatment device.

FIG. 11 is an explanatory view schematically illustrating a flow of the exhaust gas in the aftertreatment device 12. Hereinafter, the flow of the exhaust gas will be described with reference to FIGS. 6 to 11. When the exhaust gas is discharged from the engine main body 11 of FIG. 5 through the connection pipe 35, the exhaust gas is guided to the inside of the DPF case 40 through the exhaust inlet pipe 40a. The exhaust gas flows forward inside the DPF case 40. That is, the exhaust gas sequentially passes through the oxidation catalyst 41a and the soot filter 41b to reach the mixer 70. Then, the exhaust gas enters the mixer 70 through the slits 72 on the side surface of the cylindrical body 71 of the mixer 70 and turns along an inner peripheral surface of the cylindrical body 71.

Meanwhile, urea water is injected from the urea water injection portion 90. The urea water enters the cylindrical body 71 from the hole 80a of the attaching portion 80 through the second opening 71b1 of the other end 71b of the cylindrical body 71 and is mixed with the exhaust gas turning in the cylindrical body 71.

The exhaust gas mixed with the urea water in the mixer 70 then travels inside the exhaust connection pipe 60 while turning in the right direction and is guided to the SCR case 50. Then, the exhaust gas flows rearward inside the SCR case 50. That is, the exhaust gas sequentially passes through the selective reduction catalyst 51a and the ammonia slip suppression catalyst 51b. Thereafter, the exhaust gas is discharged from the aftertreatment device 12 through the exhaust outlet pipe 50a.

In the aftertreatment device 12 of the present embodiment, the mixer 70 is arranged at the upstream end of the exhaust connection pipe 60, and urea water is injected into the mixer 70 from the urea water injection portion 90. Arranging the mixer 70 can promote mixing of the exhaust gas and the urea water on the upstream side of the exhaust connection pipe 60. That is, in the example of the present embodiment, a turning flow is generated in the exhaust gas by the mixer 70, and the urea water is added to the turning flow, thereby promoting mixing of the exhaust gas and the urea water. This makes it possible to reduce the length of the exhaust connection pipe 60 necessary for evaporating the urea water by the heat of the exhaust gas in the exhaust connection pipe 60 (e.g. as compared with a configuration in which the mixer 70 is not provided). Therefore, the aftertreatment device 12 including the DPF case 40, the SCR case 50, the exhaust connection pipe 60, and the urea water injection portion 90 can be made compact. That is, the exhaust gas can be purified with the compact configuration of the aftertreatment device 12.

In particular, from the viewpoint of easily making the aftertreatment device 12 compact in the lateral direction, the SCR case 50 is desirably positioned side by side with the DPF case 40 in the lateral direction, and the exhaust connection pipe 60 desirably extends in the lateral direction as in the present embodiment.

In the configuration in which the aftertreatment device 12 includes the mixer 70, it is desirable to fix the mixer 70 with a plurality of members in order to improve a fixing strength of the mixer 70 and to stabilize support of the mixer 70. From this viewpoint, as in the present embodiment, the one end 71a of the mixer 70 on the downstream side in the flow direction of the exhaust gas is desirably connected to the left end 60L positioned at the upstream end of the exhaust connection pipe 60, and the other end 70b of the mixer 71 on the upstream side is desirably connected to the DPF case 40. That is, the mixer 70 is desirably attached to the upstream end (left end 60L) of the exhaust connection pipe 60 and the DPF case 40.

For example, a configuration in which the urea water injection portion 90 is attached to a pipe through which exhaust gas flows requires, in terms of layout, a dedicated pipe for bending a flow path of the exhaust gas and a dedicated component for attaching the urea water injection portion 90 to the dedicated pipe. From the viewpoint of eliminating the need for the above dedicated pipe and the like, making the aftertreatment device 12 compact, and reducing cost, the urea water injection portion 90 is desirably attached to the DPF case 40 as in the present embodiment. From the viewpoint of reliably supplying urea water to the mixer 70 from the urea water injection portion 90 attached to the DPF case 40, the mixer 70 is desirably provided on the urea water injection portion 90 side of the exhaust connection pipe 60.

In order to reliably make the aftertreatment device 12 compact, it is desirable to achieve a layout that decreases protrusion of the urea water injection portion 90 from the outer shape of the DPF case 40. From this viewpoint, the attaching portion 80 is desirably provided at the bottom 40P1 of the recess 40P, and the urea water injection portion 90 is desirably attached to the attaching portion 80 as in the present embodiment. That is, the urea water injection portion 90 is desirably attached to the attaching portion 80 positioned away from the side surface portion (left side surface portion 40L) of the DPF case 40 in the lateral direction. By providing the recess 40P in the DPF case 40, a contraction flow occurs in the exhaust gas at a position of the recess 40P, which increases a flow velocity of the exhaust gas. Therefore, a turning speed of the exhaust gas in the mixer 70 increases, which further increases the effect of promoting mixture of the exhaust gas and the urea water by the mixer 70.

From the viewpoint of forming the entire engine 10 including the engine main body 11 and the aftertreatment device 12 with a compact configuration, it is desirable to adopt a layout that decreases protrusion of the aftertreatment device 12 positioned above the engine main body 11 from the engine main body 11. In the present embodiment, as described above, the aftertreatment device 12 can be made compact (in the lateral direction in particular). Therefore, as illustrated in FIGS. 2 to 4, the entire engine 10 can be made compact (in the lateral direction in particular) even in a case where the engine main body 11 is positioned below the aftertreatment device 12.

In the present embodiment, the DPF case 40 is attached to the engine main body 11 (e.g. the connection pipe 35) via the exhaust inlet pipe 40a (see FIGS. 4 and 5). The urea water injection portion 90 attached to the DPF case 40 is positioned on the exhaust manifold 23 side of the engine main body 11, that is, on the exhaust side of the engine main body 11 (see FIGS. 2 to 4). This is because of the following reasons.

Figure 12:
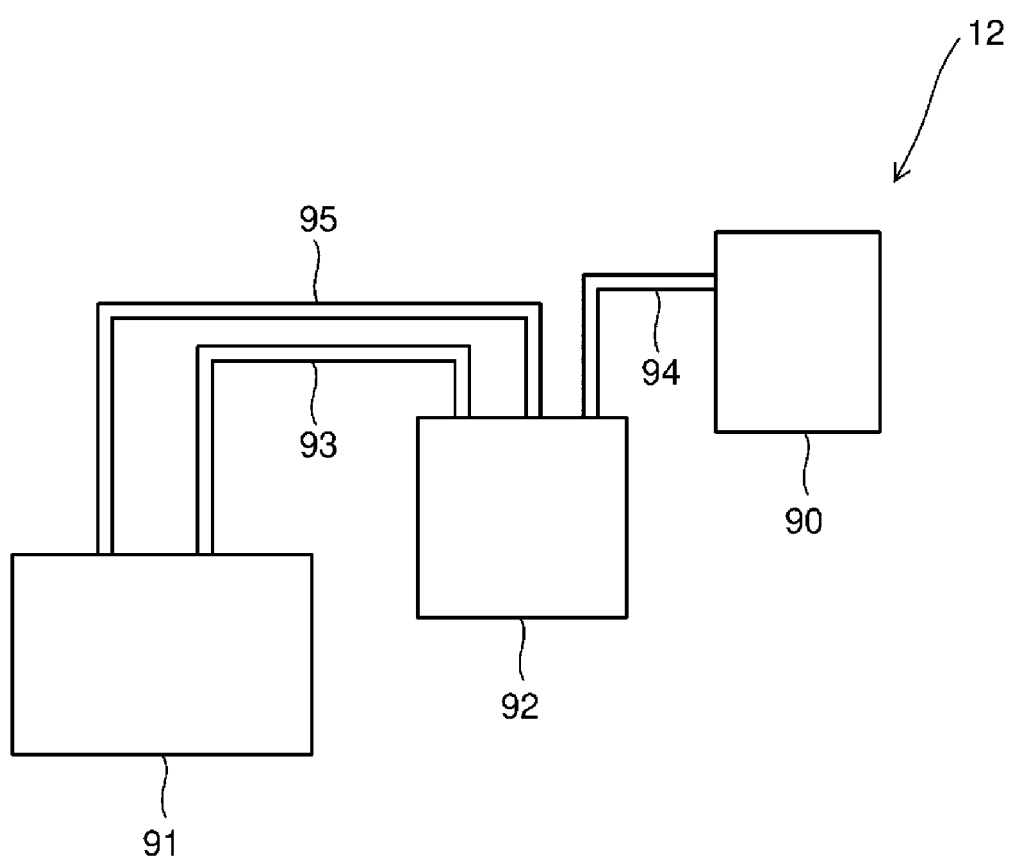
FIG. 12 is an explanatory view illustrating a configuration that supplies urea water to the urea water injection portion of the aftertreatment device.

FIG. 12 is an explanatory view illustrating a configuration that supplies urea water to the urea water injection portion 90 of the aftertreatment device 12. A urea water storage tank 91 stores urea water as a reducing agent. The urea water supply device 92 includes a pump or the like, sucks the urea water from the urea water storage tank 91 through a urea water extraction passage 93, and supplies the urea water to the urea water injection portion 90 through a urea water supply passage 94. A part of the urea water sucked by the urea water supply device 92 is returned to the urea water storage tank 91 through a urea water return passage 95.

After the engine 10 is stopped, the urea water supply device 92 drives the pump to suck the urea water remaining in the urea water injection portion 90 through the urea water supply passage 94 and return the urea water to the urea water storage tank 91. This is because, when the urea water remains inside the urea water injection portion 90 and the urea water supply passage 94 after the engine 10 is stopped, the urea water may be frozen under a low-temperature environment, for example.

On the exhaust side of the engine main body 11, a temperature rises due to heat of high-temperature exhaust gas. As in the present embodiment, in the configuration in which the DPF case 40 is attached to the engine main body 11 and the urea water injection portion 90 attached to the DPF case 40 is positioned on the exhaust side of the engine main body 11, even when the urea water is not sufficiently sucked by the urea water supply device 92 after the engine 10 is stopped, and the urea water remains in the urea water supply passage 94 and the like and is frozen in a low-temperature environment, the frozen urea water can be thawed by the heat of the exhaust gas after the engine 10 starts (until the temperature rise of the urea water supply device 92 is completed). Therefore, for example, it is unnecessary to provide a heater for warming the urea water supply passage 94 and the like to thaw the frozen urea water. That is, it is unnecessary to wind the heater around the urea water supply passage 94 and the like to warm the urea water.

Figure 13:
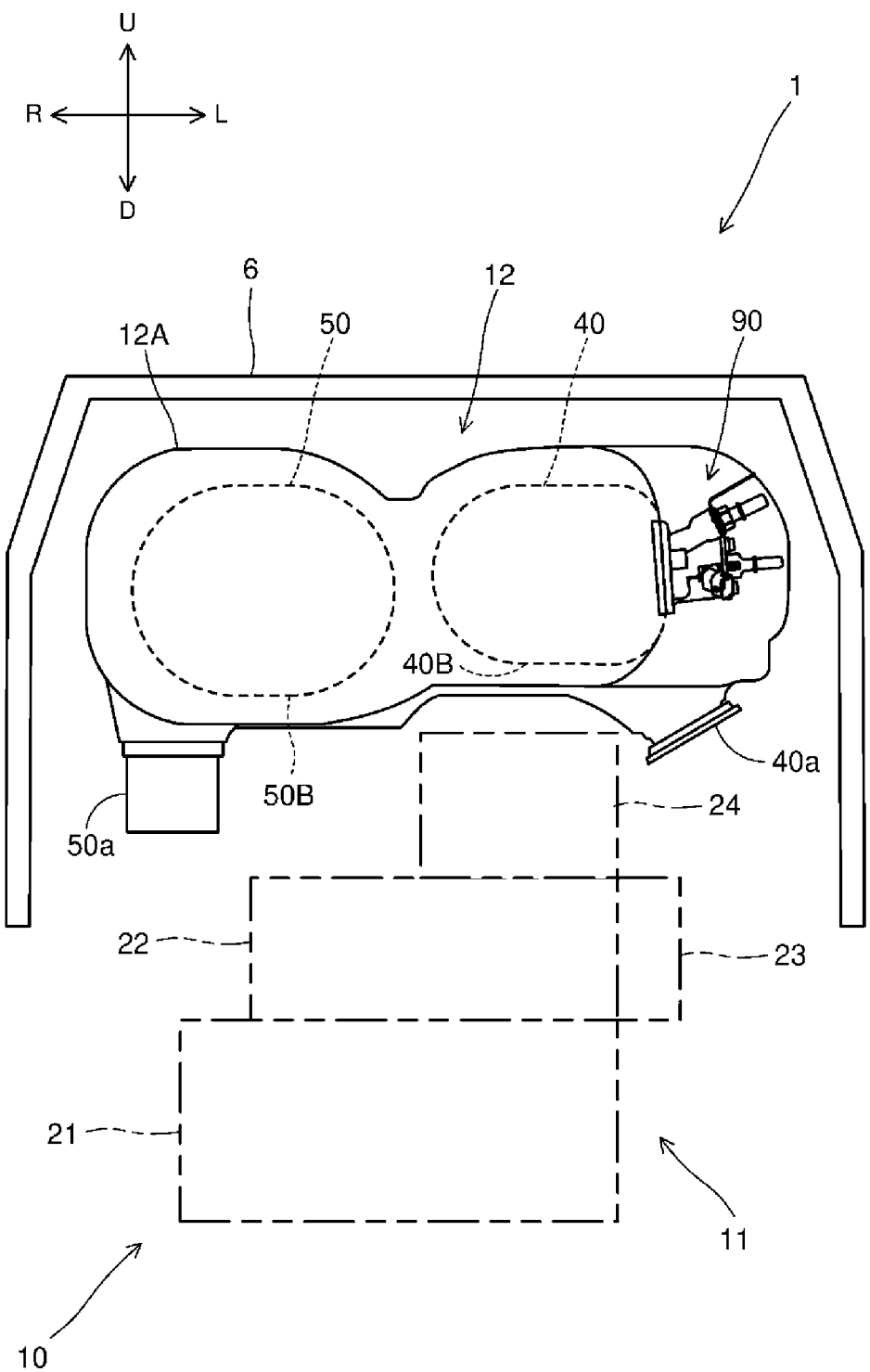
FIG. 13 is an enlarged front view illustrating a main part of the engine.

FIG. 13 is an enlarged front view illustrating a main part of the engine 10. The cylinder head cover 24 is positioned above the cylinder head 22 of the engine main body 11. Due to the presence of the cylinder head cover 24, unevenness is formed in an upper portion of the engine main body 11. The aftertreatment device 12 is arranged above the engine main body 11 thus formed. The bonnet 6 of the tractor 1 (see FIG. 1) is positioned above the aftertreatment device 12. Therefore, the aftertreatment device 12 is arranged in a limited space between the engine main body 11 and the bonnet 6.

From the viewpoint of efficiently arranging the aftertreatment device 12 in a limited space above the engine main body 11 while avoiding interference with the engine main body 11 having the uneven upper portion due to the presence of the cylinder head cover 24, the bottom surface portion 40B of the DPF case 40 is desirably positioned offset (shifted) from the bottom surface portion 50B of the SCR case 50 in an opposite direction (vertical direction in FIG. 13) between the aftertreatment device 12 and the engine main body 11. That is, in this case, by positioning either the bottom surface portion 40B of the DPF case 40 or the bottom surface portion 50B of the SCR case 50 above the cylinder head cover 24, the aftertreatment device 12 can be arranged in the limited space between the engine main body 11 and the bonnet 6 while avoiding the interference with the engine main body 11.

The above offset also improves the degree of freedom in mounting components in the upper portion of the engine main body 11. For example, the components arranged in the upper portion of the engine main body 11 can be arranged below either the bottom surface portion 40B of the DPF case 40 or the bottom surface portion 50B of the SCR case 50 to avoid interference with the aftertreatment device 12.

In particular, in a configuration in which the DPF case 40 is arranged on the exhaust side of the engine main body 11 with respect to the SCR case 50, it is possible to adopt a layout in which the DPF case 40 is arranged above the component (cylinder head cover 24) in the upper portion of the engine main body 11. Therefore, the aftertreatment device 12 can be arranged in the limited space above the engine main body 11 while avoiding interference of the DPF case 40 with the cylinder head cover 24. From the viewpoint of achieving such an arrangement, the bottom surface portion 40B of the DPF case 40 is desirably positioned offset upward from the bottom surface portion 50B of the SCR case 50 in the opposite direction.

[3. Supplementary Note]

In the present embodiment, an example where the mixer 70 is configured by forming the slits 72 in the cylindrical body 71 has been described. However, the mixer 70 is not limited to the configuration of the present embodiment. The mixer 70 only needs to generate a turning flow in the exhaust gas to promote mixing with urea water. However, from the viewpoint of obtaining effects of the present embodiment with a simple configuration in which the slits 72 are formed in the cylindrical body 71, the mixer 70 desirably has the configuration of the present embodiment.

[4. Additional Note]

The aftertreatment device and the engine described in the present embodiment can be expressed as in the following additional notes.

An aftertreatment device according to an additional note (1) includes:
 a DPF case;
 an SCR case;
 an exhaust connection pipe that connects the DPF case and the SCR case;
 a mixer arranged at an upstream end of the exhaust connection pipe in a flow direction of exhaust gas; and
 a urea water injection portion that injects urea water into the mixer.

An aftertreatment device according to an additional note (2) is the aftertreatment device according to the additional note (1), in which
 a part of the exhaust connection pipe is positioned inside the DPF case.

An aftertreatment device according to an additional note (3) is the aftertreatment device according to the additional note (1), in which
 the mixer is attached to the upstream end of the exhaust connection pipe and the DPF case.

An aftertreatment device according to an additional note (4) is the aftertreatment device according to the additional note (3), in which:
 the urea water injection portion is attached to the DPF case; and
 the mixer is provided on the urea water injection portion side of the exhaust connection pipe.

An aftertreatment device according to an additional note (5) is the aftertreatment device according to any one of the additional notes (1) to (4), in which:
 the SCR case is positioned side by side with the DPF case in a lateral direction intersecting a longitudinal direction of the DPF case; and
 the exhaust connection pipe extends in the lateral direction.

An aftertreatment device according to an additional note (6) is the aftertreatment device according to the additional note (5), in which:
 the DPF case includes an attaching portion to which the urea water injection portion is attached; and
 the attaching portion is positioned away in the lateral direction from a side surface portion along the longitudinal direction.

An aftertreatment device according to an additional note (7) is the aftertreatment device according to the additional note (6), in which:
 the DPF case further includes a recess recessed in the lateral direction from the side surface portion along the longitudinal direction; and
 the recess has a bottom positioned away from the side surface portion in the lateral direction; and
 the attaching portion is positioned at the bottom of the recess.

An engine according to an additional note (8) includes:
 the aftertreatment device according to any one of the additional notes (1) to (7); and
 an engine main body positioned below the aftertreatment device.

An engine according to an additional note (9) is the engine according to the additional note (8), in which:
 the DPF case is attached to the engine main body; and
 the urea water injection portion is attached on an exhaust side of the engine main body in the DPF case.

An engine according to an additional note (10) is the engine according to the additional note (9), in which
 a bottom surface portion of the DPF case is positioned offset from a bottom surface portion of the SCR case in an opposite direction between the aftertreatment device and the engine main body.

An engine according to an additional note (11) is the engine according to the additional note (10), in which
 the bottom surface portion of the DPF case is positioned offset upward from the bottom surface portion of the SCR case in the opposite direction.

Although the embodiments of the present invention have been described above, the scope of the present invention is not limited thereto, and the present invention can be expanded or modified without departing from the gist of the invention.

INDUSTRIAL APPLICABILITY

The present invention is applicable to a work vehicle such as a tractor.

LIST OF REFERENCE SIGNS

10 Engine
11 Engine main body
12 Aftertreatment device
40 DPF case
40B Bottom surface portion
40L Left side surface portion (side surface portion)
40P Recess
40P1 Bottom
50 SCR case
50B Bottom surface portion
60 Exhaust connection pipe
60L Left end (upstream end)
70 Mixer
80 Attaching portion
90 Urea water injection portion

The invention claimed is:

1. An aftertreatment device comprising:
 a DPF case having an inlet pipe and a bottom surface portion, the inlet pipe being positioned on a rear end side of the bottom surface portion of the DPF case;
 an SCR case having an exhaust outlet pipe and a bottom surface portion, the exhaust outlet pipe being positioned on a rear end side of the bottom surface portion of the SCR case;
 an exhaust connection pipe that connects the DPF case and the SCR case;
 a mixer arranged at an upstream end of the exhaust connection pipe in a flow direction of exhaust gas; and
 a urea water injection portion that injects urea water into the mixer.

2. The aftertreatment device according to claim 1, wherein
 a part of the exhaust connection pipe is positioned inside the DPF case.

3. The aftertreatment device according to claim 1, wherein
 the mixer is attached to the upstream end of the exhaust connection pipe and the DPF case.

4. The aftertreatment device according to claim 3, wherein:
   the urea water injection portion is attached to the DPF case; and
   the mixer is provided on the urea water injection portion side of the exhaust connection pipe.

5. The aftertreatment device according to claim 1, wherein:
   the SCR case is positioned side by side with the DPF case in a lateral direction intersecting a longitudinal direction of the DPF case; and
   the exhaust connection pipe extends in the lateral direction.

6. The aftertreatment device according to claim 5, wherein:
   the DPF case includes an attaching portion to which the urea water injection portion is attached; and
   the attaching portion is positioned away in the lateral direction from a side surface portion along the longitudinal direction.

7. The aftertreatment device according to claim 6, wherein:
   the DPF case further includes a recess recessed in the lateral direction from the side surface portion along the longitudinal direction; and
   the recess has a bottom positioned away from the side surface portion in the lateral direction; and
   the attaching portion is positioned at the bottom of the recess.

8. An engine comprising:
   the aftertreatment device according to claim 1; and
   an engine main body positioned below the aftertreatment device.

9. The engine according to claim 8, wherein:
   the DPF case is attached to the engine main body; and
   the urea water injection portion is attached on an exhaust side of the engine main body in the DPF case.

10. The engine according to claim 9, wherein
    the bottom surface portion of the DPF case is positioned offset from the bottom surface portion of the SCR case in an opposite direction between the aftertreatment device and the engine main body.

11. The engine according to claim 10, wherein
    the bottom surface portion of the DPF case is positioned offset upward from the bottom surface portion of the SCR case in the opposite direction.

* * * * *